United States Patent

Peter

Patent Number: 5,323,287
Date of Patent: Jun. 21, 1994

[54] PROTECTIVE DEVICE FOR ELECTRIC MOTORS

[75] Inventor: Cornelius Peter, Ottersweiher, Fed. Rep. of Germany

[73] Assignee: Robert Bosch GmbH, Stuttgart, Fed. Rep. of Germany

[21] Appl. No.: 872,967

[22] Filed: Apr. 24, 1992

[30] Foreign Application Priority Data

Mar. 26, 1991 [DE] Fed. Rep. of Germany ....... 4109867

[51] Int. Cl.[5] ............................................. H02H 7/08
[52] U.S. Cl. ......................................... 361/24; 361/25; 361/27; 361/103
[58] Field of Search ..................... 361/25, 23, 28, 103, 361/24, 27

[56] References Cited

U.S. PATENT DOCUMENTS 4,547,826 10/1985 Premerlani ............................ 361/25
4,573,132 2/1986 Boothman ............................ 361/25

*Primary Examiner*—Sharon D. Logan
*Assistant Examiner*—S. Jackson
*Attorney, Agent, or Firm*—Michael J. Striker

[57] ABSTRACT

A protective device for electric motors for protecting electric motors from high operational temperatures, has an element for determining an operational temperature of an electric motor and an element for automatically switching off of the electric motor when a predetermined limiting operational temperature is exceeded. The determining element is formed as electronic element for determining the operational temperature indirectly from an at least another operational parameter of the electric motor. The element for automatically switching off is formed as electronic element for automatically switching off of the electric motor.

10 Claims, 1 Drawing Sheet

PROTECTIVE DEVICE FOR ELECTRIC MOTORS

BACKGROUND OF THE INVENTION

The present invention relates to a protective device for electric motors, especially stepper motors. In particular it relates to such protective devices which have means for determination of operational temperature of an electric motor and means for automatic switching off of the electric motor in the event if a predetermined limiting operational temperature is exceeded.

In electric motors high operational temperatures are produced in the event of high and/or long loading during the operation or for example when the electric motor is blocked and nevertheless is connected to a network or a battery. High operational temperatures can lead to an increased wear of carbon brushes, commutators and bearings and in the extreme case can lead to winding short-circuiting by damaging of the isolation.

For preventing unpermissibly high operational temperatures, it is known to provide such electric motors with thermoprotective switches formed for example as a bimetal switch arranged in a circuit of the electric motor. When the excessive temperature is exceeded, the bimetal contact opens and the electric motor is switched off. Such a bimetal contact is however not only place consuming and expensive, but also very inaccurate. Moreover, it is often very difficult to arrange it at the locations which are critical with respect to a temperature increase.

SUMMARY OF THE INVENTION

Accordingly, it is an object of the present invention to provide a protective device for an electric motor, which avoids the disadvantages of the prior art.

In keeping with these objects and with others which will become apparent hereinafter, one feature of the present invention resides, briefly stated, in a protective device for an electric motor, especially a stepper motor, which has electronic means which determine an operational temperature indirectly from another operational parameter of the electric motor, and means for automatically switching off of the electric motor is formed as an electronic means.

When the protective device is designed in accordance with the present invention, a thermoswitch can be dispensed with and the determination of the operational temperature is performed by precise electronic means. Since operational temperature is determined indirectly from other operational parameters of the electric motor, the location for determination of the temperature does not play any role. A loading which is too long and too high and leads to excessive operational temperature can be determined fast, since the thermoconduction to a thermoswitch plays no role. In the known thermoswitch there can be the case when due to excessively high loading or a short circuiting an unpermissibly high temperature occurs which however due to the thermal conduction to the thermoswitch leads to a delayed switching off. With the electronic means for switching off the electric motor, a desired switching off temperature can be determined very exactly and structurally determined fluctuations practically play no role. A further advantage is that with the available determination of the rotary speed of the electric motor, an electronic control by a microcomputer for the protector device no additional structural elements are needed. Therefore the protective device is very costfavorable.

The other operational parameters for indirect determination of the operational temperature are for example the switching-on time in connection with the supply voltage and/or armature rotary speed. When the operational temperature is determined only from the switching-on time in connection with the supply voltage, no additional structural parts are needed when no rotary speed determination is provided. More precise is the determination of the operational temperature automatically when the supply voltage and the armature rotary speed are taken into consideration. The determination of the supply voltage is especially important when the supply voltage is a battery voltage, since in dependence on the loading and the charging condition it leads to different operational conditions in the electric motor.

Since alternating outside temperatures influence also the operational temperature of the electric motor, it is advantageous to use the outside temperature as a correction value for the computed operational temperature.

The electronic means for automatic switching off advantageously has a switching hysteresis. Therefore a constant switching on and off in the region of the limiting operational temperature is avoided and thereby a cooling occurs before the electric motor is again switched on.

The determination of the armature rotary speed and/or the supply voltage can be used additionally as fast acting safety device against a block or extremely high loading of the electric motor. During a blocking or extremely high load the armature rotary speed goes against the value zero, and the supply voltage collapses more or less, especially when it deals with a battery voltage. If the above mentioned operational parameters exceed a predetermined lower limiting value, then after very short switching in time, the safety device for switching off of the electric motor is activated. Alternatively, or additionally, the also exceeding of an upper limiting value of the electric excitation current can be used for this purpose.

For determination of the operational temperature it is advantageous to use a counting unit in the electronic device, which during the switching on time of the electric motor counts a counting frequency, and this counting frequency is correspondingly changeable in dependence on the supply voltage and/or the armature rotary speed and/or the outside temperature in the same sense. The given limiting operational temperature correspond then to a given counter value or the maximum counter value so that an overrun signal can be used as a switching off signal.

In accordance with a further improved embodiment, additionally for simulation of the cooling process a second counting frequency can be counted in the opposite counting direction. Thereby it is avoided that at a low loading after a sufficiently long switching-on time in insignificant manner the exceeding of the limiting operational temperature is recognized. This second counting frequency is also changeable preferably in dependence on the outside temperature.

The electronic device for calculating the operational temperature and the means for automatic switching off are preferably formed as a microcomputer. In this case no additional structural elements for forming the protective device are needed.

Alternatively to the above described solution, the determination of the operational temperature and the automatic switching off of the electric motor in the case of exceeding a predetermined limiting operational temperature by pure electronic means can be achieved in a different way. In particular, for determination of the operational temperature a temperature-dependent resistance and a comparator are used. More particularly the comparator is connectable in dependence on the voltage drop at this resistance, and acts on means for automatic switching off. The switching off is performed in the same manner, however the operational temperature is directly determined by the temperature-dependent resistance. Since it can have a very small structural size, it can be arranged practically at any location of the electric motor. For monitoring several critical locations, also several such resistances can be provided.

The above mentioned temperature dependent resistance can be formed in an advantageous manner as an NTC resistance.

The means for determination of the operational temperature can be advantageously formed so that the temperature dependent resistance forms with a further resistance a voltage divider loaded by a supply voltage. The pickup of the voltage divider is connected with an input of the comparator for comparing with a reference voltage. This comparator must advantageously have a switching hysteresis.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
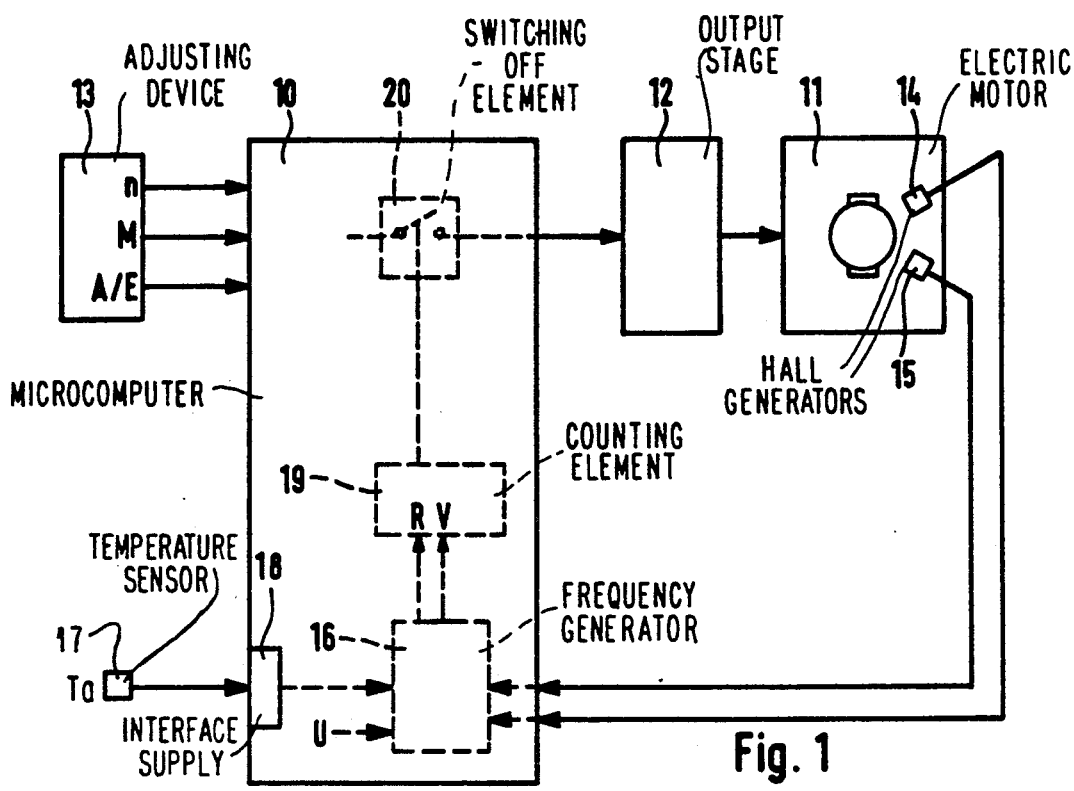
FIG. 1 is a schematic block diagram of a protective circuit for indirect determination of operational temperatures in accordance with the first embodiment of the present invention.

A protective device for electric motors shown in FIG. 1 has a microcomputer 10 for controlling an electric motor 11 through an output stage or a final amplifier 12 connected with it. The output stage can be a relay and stage or can be formed as semi-conductor switch. The adjusting commands for the operation of the electric motor 11 are supplied to the microcomputer 10 by an adjusting device 13, in order to provide for example a predetermined rotary speed n, a predetermined rotary torque N for a switching on and switching off state A/E. The adjusting device 13 can be formed in a known manner as a potentiometer, a step switch or a similar switch. The action of such an adjusting device 13 on a microcomputer or a similar electronic circuit for producing the desired operational condition of the electric motor is known in the prior art and therefore a detailed description is dispensed with.

The structural elements shown in the microcomputer 10 in broken lines serve only for illustration of the principle operation and the corresponding functions are performed by structural elements which are conventionally contained in microcomputers.

In order to determine the armature rotary speed, two Hall transmitters 14 and 15 are arranged on the electric motor 11. Their signals are supplied to a frequency generator 16 in the microcomputer 10 in order to change this frequency in dependence on the armature rotary speed. Furthermore, the supply voltage U and the outside temperature Ta are supplied to the frequency generator 16 for changing its rotary speed. The outside temperature Ta is determined by a temperature sensor 17 and supplied through a MUX-interface 18 to the microcomputer 10. An increase of the armature rotary speed the supply voltage or the outside temperature leads to an increase of the frequency of the frequency generator 16. For realizing the frequency generator 16 the microcomputer 10 can be provided with available cycle frequency which when needed is divided and in dependence on the above mentioned operational parameters changed by the counting process in the microcomputer. Analog-digital converter which is required in some cases for converting the determined operational parameter into digital values is not shown for simplification. It is however understood that it can be provided when needed.

The produced output frequency of the frequency generator 16 is supplied in a forward counting input V of a counting device 19. Simultaneously a further frequency of the frequency generator 16 is supplied to its rearward counting input R. The frequency generator 16 simulates to the cooling process or in other words the heat withdrawn outwardly from electric motor 11. The rearward counting frequency can be influenced by the outside temperature Ta in the sense that the rearward counting frequency is increased and the outside temperature Ta is reduced. With a not shown battery buffer, it can be attained that this rearward counting process which stimulates the cooling can be also used when the electric motor 11 or the supply voltage is switched off.

In accordance with a simple embodiment also the influence of the outside temperature Ta can be dispensed with. Moreover, the indirect determination of an operational temperature can be also performed so that only the supply voltage U or only the armature rotary speed is provided as the influencing operational parameter.

When in the counting device 19 a given counter state is obtained, an output signal is produced. It activates an electronic switching off device 20 to switch off the output stage 12 and thereby the electric motor 11. As a given counter state, the maximum counter state of the counting device 19 can be utilized, and then the signal of switching off can be the overrunning signal of the counting device 19. The switching off device 20 can have a switching hysteresis or similar switching hysteresis can be produced by a special operation in the microcomputer 10. For this purpose for example a second, lower counter state can be provided in the counter device 19, so that when it is exceeded the repeated switching in process is released. The counter state of the counter device 19 represents the indirect operational temperature of the electric motor 1 which is obtained or counted by another operational parameter.

The indirect determination of the operational parameter can be also performed in a different manner in the microcomputer 10. In other words, this can be performed by combining of the utilized operational parameters by a predetermined algorhythms, which are provided by the program of the microcomputer 10.

Alternatingly to the microcomputer 10, also another digital or analog operating electronic circuit can be utilized for indirectly determining the operational temperature in a corresponding manner. In the case of a digital solution, this can be done by the arrangement of a frequency generator, a counting device and a switching off device as shown in broken line. In an analogous solution it can be achieved by variable voltage source for charging or discharging of a capacitor. In this variable voltage source the output voltage can be determined in dependence on the used operational parameter.

Figure 2:
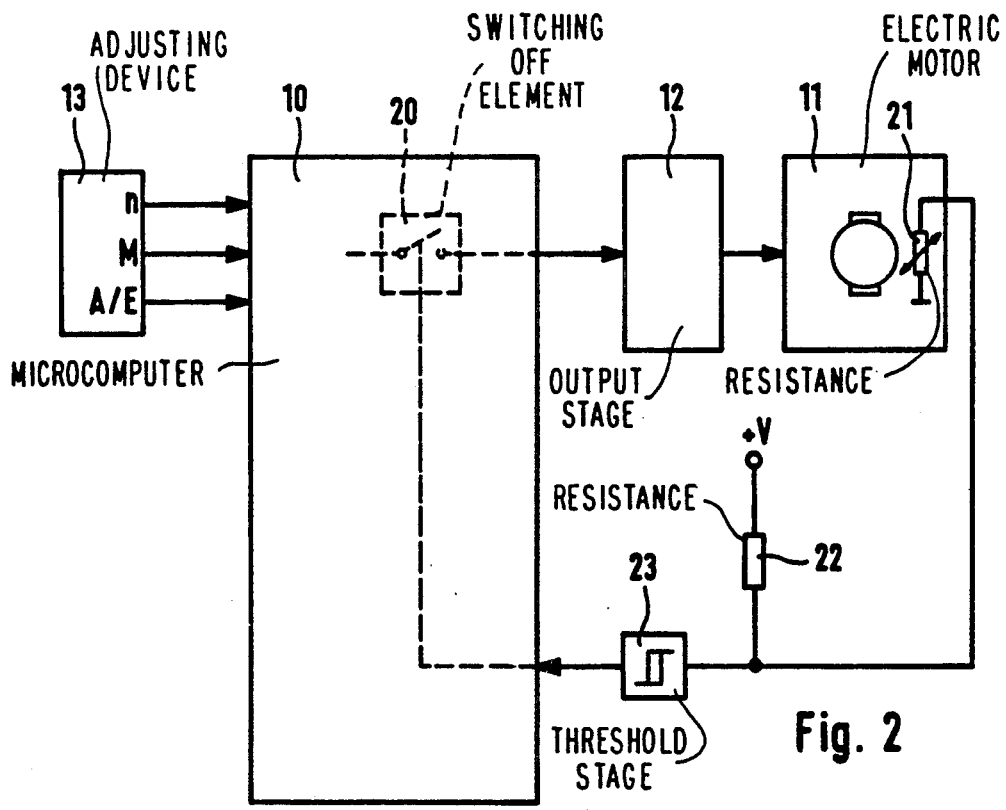
FIG. 2 is a schematic block diagram of a protective device for determination of the operational temperatures through a temperature-dependent resistance in accordance with a second embodiment of the invention.

FIG. 2 shows another embodiment of the inventive device, and structural elements which are the same are identified with the same reference numerals and not described again in detail. The alternative variants which are used with the first embodiment of the invention can be naturally used with the second embodiment as well.

A temperature-dependent resistance 21 is arranged in or on the electric motor 11 and formed as a NTC-resistance. Together with a further resistance 22 it forms a series connection, to which a supply voltage U is applied. Naturally, a stabilized voltage can be used here. The pickup of the voltage divider which is formed from the above mentioned two resistances 21 and 22 is supplied to a threshold stage 23. The threshold stage 23 can be formed for example as a Schmitttrigger, and its output signal is supplied to the microcomputer 10 or the electronic switching off device 20 for switching off the electric motor 11.

When the operational temperature increases, the resistance of the temperature dependent resistor 21 is decreased, and the pickup voltage of the voltage divider and therefore the input voltage of the threshold stage 23 are also decreased. When the threshold value provided by the threshold stage 23 is exceeded, the electric motor 11 is switched off through the switching operation 20 in the above described manner. Due to the switching hysteresis of the threshold stage 23, the repeated switching on is performed first with an operational voltage which is reduced by a predetermined magnitude.

The operation of the threshold stage 23 can naturally be performed by the computer 10. For example, the temperature-dependent resistance 21 or the voltage divider can be connected with the microcomputer 10 through an analog-digital converter.

In a simple embodiment the microcomputer 10 can be dispensed with and the switching off device 20 can be formed by a simple switch for example a semiconductor switch. In such a simplified embodiment, the adjusting device 13 can be replaced with a simple switch and/or a potentiometer for adjusting the rotary speed.

Alternatingly to the above described switching hystereses in both examples, naturally a time control can be provided. In other words, after switching off of the electric motor 11, the repeated switching on can be delayed by a fixed time by means of a timing member or a delaying member.

It will be understood that each of the elements described above, or two or more together, may also find a useful application in other types of constructions differing from the types described above.

While the invention has been illustrated and described as embodied in a protective device for an electric motor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed and desired to be protected by Letters Patent is set forth in the appended claims:

1. A protective device for electric motors for protecting electric motors from high operational temperatures, comprising means for determining an operational temperature of an electric motor; and means for automatically switching off of the electric motor when a predetermined limiting operational temperature is exceeded, said determining means being formed as electronic means for determining the operational temperature indirectly from at least one other operational parameter of the electric motor, said means for determining at least one other operational parameter determining a working time in connection with at least one a supply voltage and an armature rotary speed.

2. A protective device as defined in claim 1, wherein said means for determining determine said switching on time in connection with the supply voltage which is a battery voltage.

3. A protective device as defined in claim 1, wherein said means for determining includes at least one Hall transmitter for determining the armature rotary speed.

4. A protective device as defined in claim 1; and further comprising means for determining an outside temperature and using it as a correction value for a calculated operational temperature.

5. A protective device as defined in claim 1, wherein said means for automatic switching off of the electric motor have a switching hysteresis.

6. A protective device as defined in claim 1, wherein said switching off means includes means for switching off the electric motor in the event of one of exceeding a lower limiting value of the armature rotary speed, exceeding a lower limiting value of the supply voltage, and exceeding an upper limiting value of an electrical excitation current during a predetermined switching-in time interval.

7. A protective device as defined in claim 1, wherein said electronic means for indirectly determining the operational temperature include counting means which during a switching-in time of the electric motor counts a count frequency which is changeable in dependence on one of the supply voltage, the armature rotary speed, and an outside temperature in the same sense, and a predetermined limiting operational temperature is associated with one of a predetermined counter value and a maximum counter value.

8. A protective device as defined in claim 7, wherein said counting means count a second counting frequency in an opposite counting direction for simulating a cooling process.

9. A protective device as defined in claim 8, wherein said counting means counts said second counting frequency which is changeable in dependence on an outside temperature.

10. A protective device as defined in claim 1, wherein said electronic means for determining and said means for automatically switching are formed as a microcomputer.

* * * * *